(12) United States Patent
Bean et al.

(10) Patent No.: US 7,050,625 B2
(45) Date of Patent: May 23, 2006

(54) METHOD AND DIGITAL CAMERA FOR INDICATING WHEN IMAGE DATA HAS BEEN CAPTURED FOR A THREE-DIMENSIONAL TARGET OBJECT

(75) Inventors: Heather N. Bean, Fort Collins, CO (US); Mark N. Robins, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 796 days.

(21) Appl. No.: 10/274,120

(22) Filed: Oct. 21, 2002

(65) Prior Publication Data

US 2004/0075756 A1    Apr. 22, 2004

(51) Int. Cl.
*G06K 9/00* (2006.01)

(52) U.S. Cl. .................................................... 382/154
(58) Field of Classification Search ................. 382/154
See application file for complete search history.

(56) References Cited

U.S. PATENT DOCUMENTS

| | | | |
|---|---|---|---|
| 4,791,676 A * | 12/1988 | Flickner et al. ............. | 382/204 |
| 5,621,807 A | 4/1997 | Eibert et al. | |
| 5,633,995 A | 5/1997 | McClain | |
| 5,734,743 A * | 3/1998 | Matsugu et al. ............. | 382/154 |
| 5,745,175 A | 4/1998 | Anderson | |
| 5,845,006 A * | 12/1998 | Sumi et al. .................. | 382/154 |
| 5,867,592 A * | 2/1999 | Sasada et al. ................ | 382/154 |
| 5,943,164 A * | 8/1999 | Rao ........................... | 359/462 |
| 6,014,472 A * | 1/2000 | Minami et al. .............. | 382/285 |
| 6,122,062 A | 9/2000 | Bieman et al. | |
| 6,173,066 B1 * | 1/2001 | Peurach et al. ............. | 382/103 |
| 6,222,937 B1 * | 4/2001 | Cohen et al. ................ | 382/154 |
| 6,331,887 B1 | 12/2001 | Shiraishi et al. | |
| 6,519,358 B1 * | 2/2003 | Yokoyama et al. ......... | 382/154 |
| 2001/0051002 A1 * | 12/2001 | Shimamura et al. ........ | 382/154 |

* cited by examiner

*Primary Examiner*—Joseph Mancuso
*Assistant Examiner*—Robert Tarcu

(57) ABSTRACT

A method and digital camera are disclosed for capturing a complete set of image data for a three-dimensional target object by capturing image data from multiple images from different perspectives of the target object. The camera captures an image of the object from an initial perspective. Based on image data retrieved from the image, discontinuous edges of the object are identified for the initial perspective. The camera continues capturing image data for the object by capturing images from different perspectives, until complete image data is obtained. As each image is captured, the camera attempts to resolve discontinuous edges identified in any of the images. If all of the discontinuous edges cannot be resolved, then another image of the target object is captured from another perspective. When all of the discontinuous edges are resolved, the camera indicates that complete image data has been obtained, using an indicator.

21 Claims, 9 Drawing Sheets

METHOD AND DIGITAL CAMERA FOR INDICATING WHEN IMAGE DATA HAS BEEN CAPTURED FOR A THREE-DIMENSIONAL TARGET OBJECT

TECHNICAL FIELD

The technical field relates generally to digital imaging. More particularly, the technical field relates to capturing image data for a three-dimensional target object using a digital camera.

BACKGROUND

In the field of digital imaging, it is desirable to capture complete visual information on three-dimensional objects. As used herein, "complete image data" or a "complete set of image data" refers to a set of images of a target object in which each visible point on the object is represented in at least one of the images. Complete image data for three-dimensional objects may be used, for example, in engineering systems, such as computer-aided design (CAD) systems, to create a representation of a three-dimensional target object. Methods are known for obtaining three-dimensional data for an object. For example, digital cameras may use range-finding methods to capture distance and other metric information for a target object relative to a chosen coordinate system.

To obtain image data for multiple sides of the target object, existing systems capture multiple images of the target object from different perspectives. In one use, a hand-held digital camera may allow the user to manually capture images from a variety of perspectives while walking around the target object. Methods, such as stitching algorithms, are known for combining the image data retrieved from multiple images from different perspectives. The images from different perspectives include common, or overlapping, features. In this regard, three-dimensional image capturing methods are analogous to do-it-yourself methods of creating a panoramic view from multiple separate photographs using a film-based camera. The photographer would try to ensure that similar items appear in adjacent pictures so that the photographs can be aligned with each other to create the final image.

In order to capture a complete set of three-dimensional image data for a target object, it is necessary to capture the image from several available perspectives. For a simple object, such as a ball resting on a table, it is relatively simple task to capture sufficient image data to recreate the three-dimensional image. Images from only a few different perspectives may suffice to capture all of the image data. More complex objects present additional challenges. Various parts of the object may be hidden from many views, and it may be necessary to obtain more images from more perspectives in order to create a complete set of image data. For example, an object with a cavity may be difficult or impossible to fully capture if the camera cannot capture images inside the cavity.

Existing camera systems do not provide a way of determining when the complete image data has been captured. This is particularly a problem when capturing three-dimensional image data for a very large object, such as a building or other structure. A portable camera may be used to capture images of the building in the field. A computer system, separate from the portable camera, may be used to combine the images to create three-dimensional image data. For example, the computer system may be located in an engineering lab, and the camera may download the data for each of the images into the computer system after the user returns to the lab. A problem occurs when the user returns to the lab and downloads the image data, only to discover that the camera did not capture sufficient images to completely represent the object. This wastes the user's time, because it requires the user to determine which additional perspectives are required to create the complete three-dimensional image data and to then return to the target object to capture additional images from the missing perspectives to complete the project. There exists a need to determine when sufficient image data has been captured to create complete three-dimensional image representations.

SUMMARY

A method is disclosed for capturing image data for a three-dimensional target object and indicating when a complete set of image data has been captured, using a digital camera to collect image data from multiple perspectives of the target object. The camera captures an image of the target object from an initial perspective. Based on the image data associated with the initial image, discontinuous edges of the target object are identified for the initial perspective. The camera continues to capture image data for the target object by capturing images from different perspectives, until a complete set of image data is obtained. As each image is captured, the camera attempts to extend discontinuous edges identified in previous images, using the image data of the three-dimensional object from the preceding images to resolve the discontinuous edges. If all of the discontinuous edges cannot be resolved, then the user captures another image of the target object from another perspective. Once all of the discontinuous edges are resolved, the camera signals to the user that complete image data has been obtained, using an indicator.

A digital camera is also disclosed having a memory, a processor, and an indicator that signals when the camera has captured complete image data for a target object. The memory stores image data for each of a plurality of images of the target object. The processor receives the image data and stores the image data to the memory. Based on the image data, the processor identifies discontinuous edges in each of the images and attempts to resolve the discontinuous edges using image data from the other images. When all of the discontinuous edges are resolved, the camera has captured complete image data, and the indicator indicates that the camera has captured complete image data.

A computer-readable medium is also disclosed having stored thereon computer-executable instructions for performing a method of determining when a digital camera has captured sufficient image data for a target object. Image data is captured for multiple images of a target object, from different perspectives. The image data is stored in a memory as the image data is captured. Discontinuous edges identified in one or more of the images are resolved using the image data from the other images. When all of the discontinuous edges are resolved, an indicator indicates that complete image data has been received.

DESCRIPTION OF THE DRAWINGS

The detailed description will refer to the following drawings, wherein like numerals refer to like elements, and wherein.

DETAILED DESCRIPTION

Figure 1A:
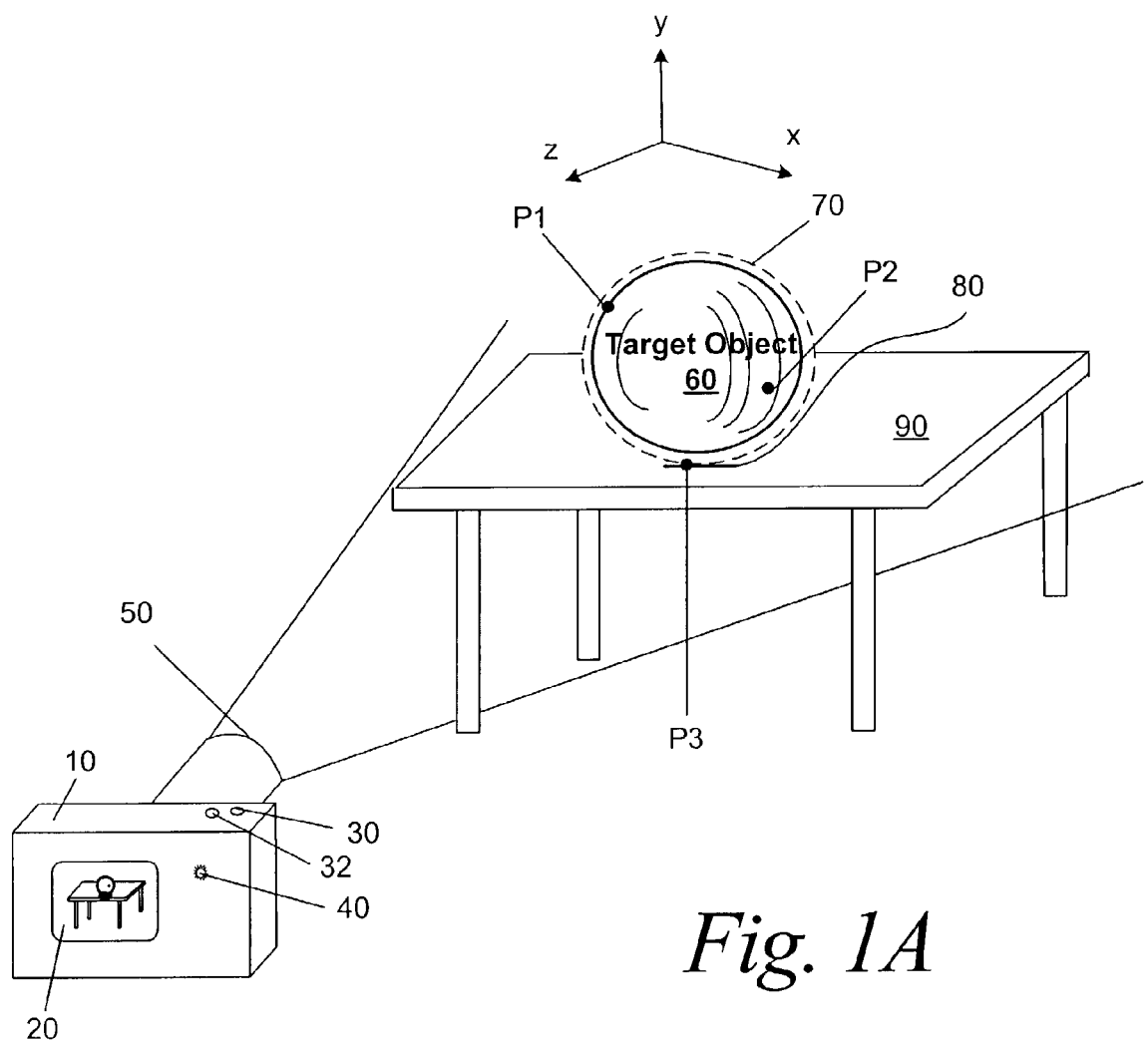
FIG. 1A shows a perspective view of a digital camera capturing an image of a target object.

FIG. 1A shows a perspective view of a digital camera 10 capturing an image of a target object 60—in this example, a soggy beach ball resting on a table 90. The camera 10 includes a lens 50 and a display 20 that displays the image to be captured. A user input device 30 acts as a shutter control to capture the image displayed on the display 20, and to store data for the image in a memory (not shown) of the camera 10. The camera 10 also includes an indicator 40, such as a light-emitting diode (LED), that indicates to the user when sufficient image data has been collected for the target object 60.

In the example shown, the camera 10 includes a user input device 32 used to select a target object 60 for which data may be captured. In one embodiment, the display 20 may identify an object as the target object 60, before data is captured. Using the user input device 32, the user can select or adjust the selected target object 60, for example, by expanding or narrowing a selection on the display 20. In one embodiment, the camera 10 automatically identifies the target object 60, for example, by identifying opaque objects near the center of the display 20. The user may then adjust the camera-selected object as desired.

In use, the camera 10 captures multiple images of the target object 60 from different perspectives. From each perspective, the camera 10 captures image data for the target object 60. The image data includes metric data also for points (e.g., P1, P2, P3) on the target object 60. The metric data may include, for example, distances between data points and distances from the data points to the camera 10. Although FIG. 1A shows three data points P1, P2, P3, more data points may be used to capture the 3D data desired. An example x-y-z coordinate system is associated with the target object 60 and is shown in the example of FIG. 1A for reference. The locations of data points P1, P2, P3 are determined relative to the coordinate system. The coordinate system may have an origin established at any point, and the x-y-z coordinates may be orthogonal or may be fixed at any other desired angles. The coordinates of the data points P1, P2, P3 are stored in the camera's memory. In the example of FIG. 1A, each data point reference number, e.g., P1, P2, P3, refers to a separate data point on the target object 60.

From each different perspective of the camera 10, the target object 60 has edges that can be detected using range-finding and other algorithms known in the art. An edge is defined by a plurality of data points, e.g. P1, P3, for the target object 60. If an edge of an object contacts another object, such as the surface of the table 90, then the edge is referred to as a contact edge. If the edge does not contact another object, then the edge is a discontinuous edge. A discontinuous edge may be identified by gathering data for distances from the image to the camera 10. At the discontinuous edge, the distance to the camera 10 will abruptly increase, going from the target object 60 to a background object (not shown), if any. From the perspective of the camera 10 shown in FIG. 1A, the target object 60 has a discontinuous edge 70 generally around the upper portion of the beach ball's circumference and a contact edge 80 where the target object 60 touches the table 90. The edge 70 is identified by a difference in distance between a data point P1 on the edge 70 and a data point (not shown) behind the target object 60.

As used herein, the term "resolved" refers to reclassification of a discontinuous edge (identified in a first image) as an interior or boundary point using image data from another image.

The camera 10 captures images of the target object 60 from multiple perspectives. In so doing, an edge that is classified as a discontinuous edge from one perspective may be resolved in an image captured from another perspective to collect a complete set of data for the target object 60. Unresolved discontinuous edges indicate that data for the target object 60 has not been captured completely. When all discontinuous edges have been resolved, the camera 10 indicates that complete image data has been obtained. As used herein, "complete image data" or a "complete set of image data" refers to a set of images of a target object in which each visible point on the object is represented in at least one of the images.

In the example of FIG. 1A, the discontinuous edge 70 is defined by multiple data points, although only one discontinuous edge data point P1 is shown. Each data point P1, P2, P3 for the target object 60 is classified by the camera 10 as either an interior point or a boundary point based on coordinates of the data point. A boundary point is a point located along an edge of the target object. An interior point is a data point not located along an edge. Boundary data points are further classified as either contact points or non-contact points. Contact boundary points refer to data points along a contact edge 80. Non-contact boundary points refer to data points along a discontinuous edge 70. The example of FIG. 1A shows data points P1, P2, P3 for a non-contact boundary point P1, an interior point P2, and a contact boundary point P3. As data is gathered from different perspectives of the camera 10, points classified as non-contact points from one perspective later may be classified as interior points, as additional data is retrieved.

Figure 1B:
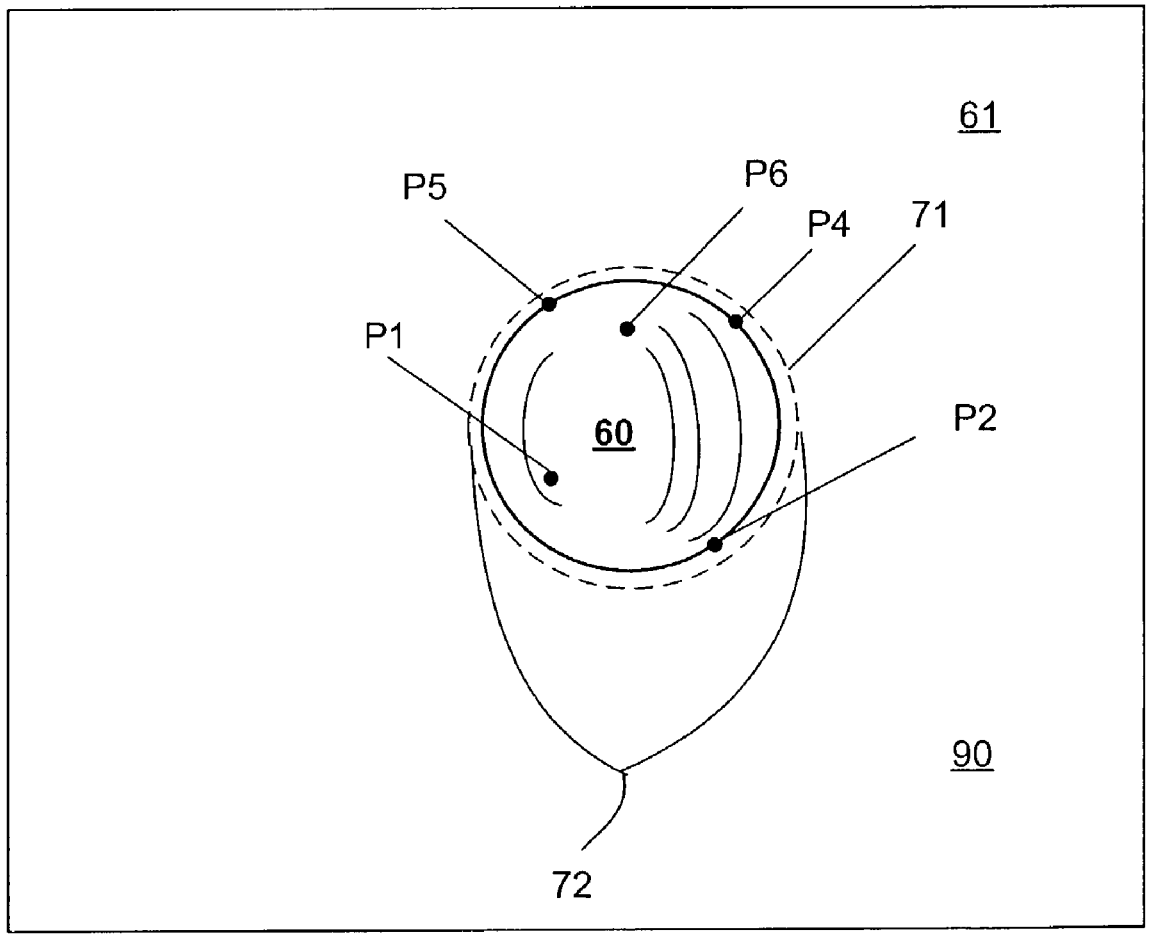
FIG. 1B shows the target object of FIG. 1A from a top perspective.

FIG. 1B shows the target object 60 of FIG. 1A from a top perspective. After capturing image data from the perspective shown in FIG. 1A, the user has positioned the camera (not shown in FIG. 1B) above the target object 60 in FIG. 1B. The non-contact boundary data point P1 that defined the discontinuous edge (70 in FIG. 1A) is now an interior point P1, along with other data points (not shown) that defined the discontinuous edge (70 in FIG. 1A). In the example perspective of FIG. 1B, the interior data point P2 remains visible, and the perspective allows retrieval of data for new data points P4, P5, P6 as well as numerous other new data points (not shown). Although data point P2 appears as a non-contact boundary point in FIG. 1B, point P2 is known to be an interior point based on the image data captured from the perspective of FIG. 1A. A discontinuous edge 71 is also shown and is defined by data points, e.g. P4, P5.

Although the entire edge 71 appears discontinuous from the perspective of FIG. 1B, a front portion 72 of the edge 71 is defined by data points, e.g. P2, that were captured in the first perspective shown in FIG. 1A. Therefore, after combining data from the perspectives shown in FIGS. 1A and 1B, the camera 10 determines that the front portion is not discontinuous. Data points P4 and P5 were not resolved as interior points in any previous perspectives, so after capturing the image from the second perspective of FIG. 1B, data points P4 and P5 remain non-contact boundary points. In the example perspective of FIG. 1B, there are no contact edges (e.g., 80 in FIG. 1A).

The process of capturing image data from different perspectives continues until all discontinuous edges are resolved. Image data from the images is later combined to create image data for the complete surface of the three-dimensional target object 60. The camera 10 indicates to the user when complete image data has been captured for the target object 60, using the indicator 40. For example, the indicator 40 may be a LED that lights when all data points have been resolved as interior points or contact boundary points. The camera 10 determines whether complete image data has been obtained by identifying discontinuous edges of the target object 60. A discontinuous edge suggests that the target object 60 extends beyond the edge captured in a particular image. The target object 60 is not fully captured until another image is captured of the object from a perspective showing the object 60 beyond the discontinuous edge, for example, from the opposite side of the object 60.

In one embodiment, the camera 10 indicates to the user which additional perspectives are required to obtain a complete set of image data. For example, after capturing numerous images, the user may want to know which additional perspectives are required. Depending upon the nature of the missing perspectives, the user may wish to capture the missing perspectives, or may determine that sufficient image data has been obtained, even though the camera 10 has not captured a complete set of image data. For example, in the case of a target object 60 with a cavity (not shown), the camera 10 may not be able to capture complete image data. In one embodiment, the camera 10 displays on the display 20 captured images stored in memory 12 that include non-contact boundary points, and indicates the locations of the non-contact boundary points and/or the entire discontinuous edges along which the non-contact boundary points are located. The captured images maybe displayed in response to a signal from a user input device (not shown). In one embodiment, if multiple stored images include non-contact boundary points, each of the images may be displayed in portions of the display 20, or each image may be displayed separately and a user input device (not shown) may allow the user to scroll through the stored images containing non-contact boundary points. By viewing the images that still contain unresolved non-contact boundary points, the user can determine whether or not additional images can be obtained to resolve those points. For example, in the case of a target object 60 with a cavity (not shown) the user may conclude that no additional data points can be obtained to resolve the discontinuous edge proximate the cavity. On the other hand, the missing image(s) may simply be the result of the user's oversight or failure to obtain images with overlapping data points. In these cases, the user can capture the missing image perspectives.

Figure 2A:
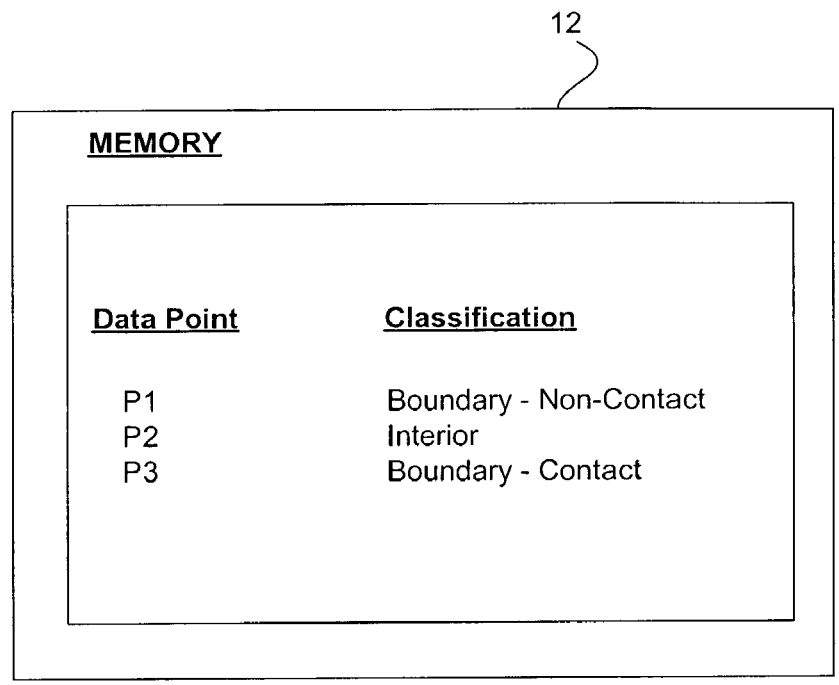
FIGS. 2A–2B are block diagrams of example data stored in memory of the camera.
Figure 2B:
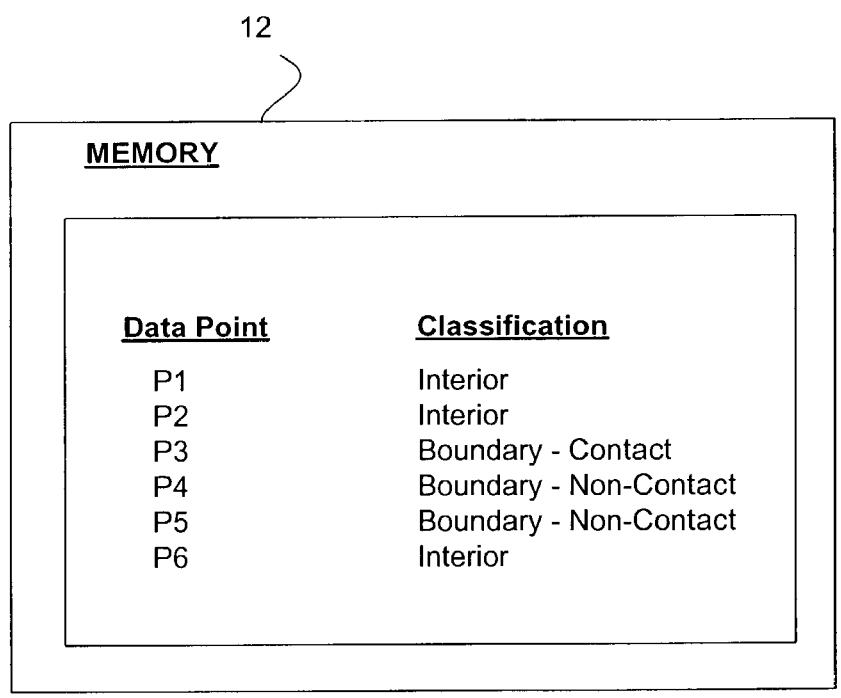

FIGS. 2A–2B show example data stored in memory 12 of the camera (not shown) after capturing the data from the perspectives of FIGS. 1A and 1B, respectively. As shown, the data includes for each data point P1, P2, P3, P4, P5, P6 a status as either interior, boundary—contact, or boundary—non-contact. In FIG. 2A, point P1 is classified as a boundary—non-contact, indicating that data point P1 is located at a discontinuous edge. After capturing additional data from the perspective of FIG. 1B, the discontinuous edge (70 in FIG. 1A) has been resolved at the portion where data point P1 is located, so data point P1 is reclassified as an interior point in FIG. 2B. Also, the new data points P4, P5, P6 captured from the perspective of FIG. 1B have been added to the memory 12.

Figure 3:
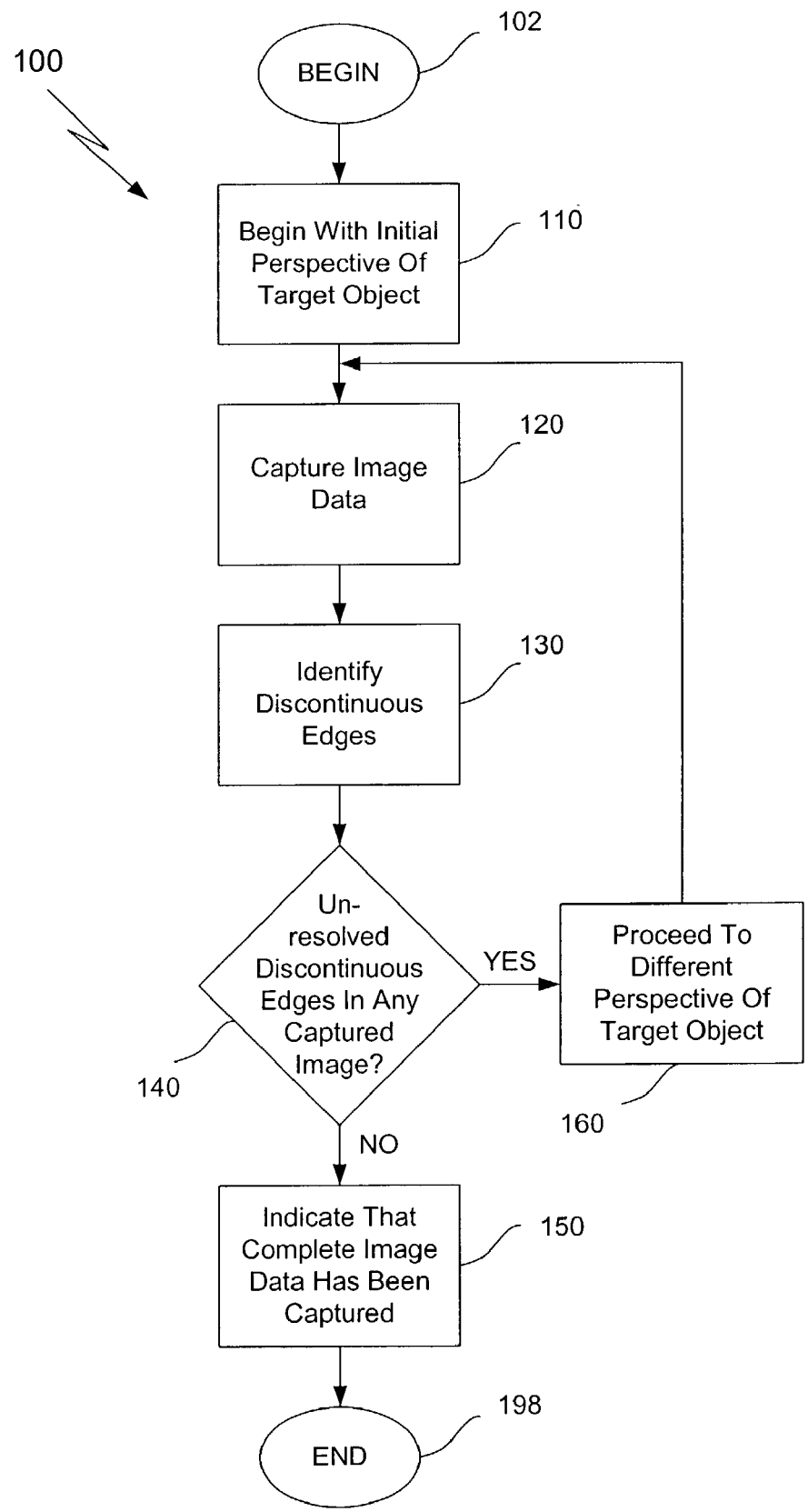
FIG. 3 shows a flow chart of a method used to capture image data.

FIG. 3 shows a flow chart of one implementation of a method 100 used to capture image data. The method 100 begins 102 and the camera starts 110 from an initial perspective of the target object 60. The camera 10 captures an image 120 having image data from the target object 60, from the current perspective. The image data includes metric information for the target object 60. In one embodiment, this metric information includes information relating to distances from the camera 10 to multiple data points (e.g., P1, P2 in FIG. 1A) on the target object 60. Based on the distance information from the camera 10 to the reference points, distances between reference points (e.g. P1, P2) in FIG. 1A) can be extrapolated. Using the image data, the camera 10 identifies 130 discontinuous edges (e.g. 70 in FIG. 1A) of the target object 60. A particular discontinuous edge 70 may be identified by one or more reference points (e.g., P1 in FIG. 1A) on the image, along the edge 70.

The camera 10 attempts to resolve discontinuous edges 70 by comparing newly-retrieved data from the current perspective with data retrieved from other perspectives stored in memory (12 in FIG. 2). The camera 10 determines 140 whether there are any unresolved discontinuous edges 70 for the target object 60. For example, the camera 10 determines, based on data points stored in memory, whether there are any non-contact boundary points that remain unresolved. The non-contact boundary points identify a discontinuous edge(s). If there are no unresolved discontinuous edges ("no" branch at block 140), then the camera 10 indicates 150 that complete image data has been captured for the target object 60, and the method 100 ends 198. If there are unresolved discontinuous edges ("yes" branch at block 140), then the user proceeds to a different perspective 160 of the target object 60 and captures additional image data 120 until complete image data has been retrieved.

In one embodiment, the indicator (40 in FIG. 1A) illuminates only when complete image data has been captured, and implicitly indicates to the user that additional data is required to be captured from another perspective by not illuminating. In another embodiment, the indicator 40 may have one or more LEDs that affirmatively indicate that additional data is needed. For example, the indicator 40 may include two separate LEDs—one that illuminates when additional data is needed and another that illuminates when complete image data has been captured. In another example, the indicator 40 may indicate a first color when additional data is required and a second color when complete data has been obtained, such as red and green, respectively.

Figure 4:
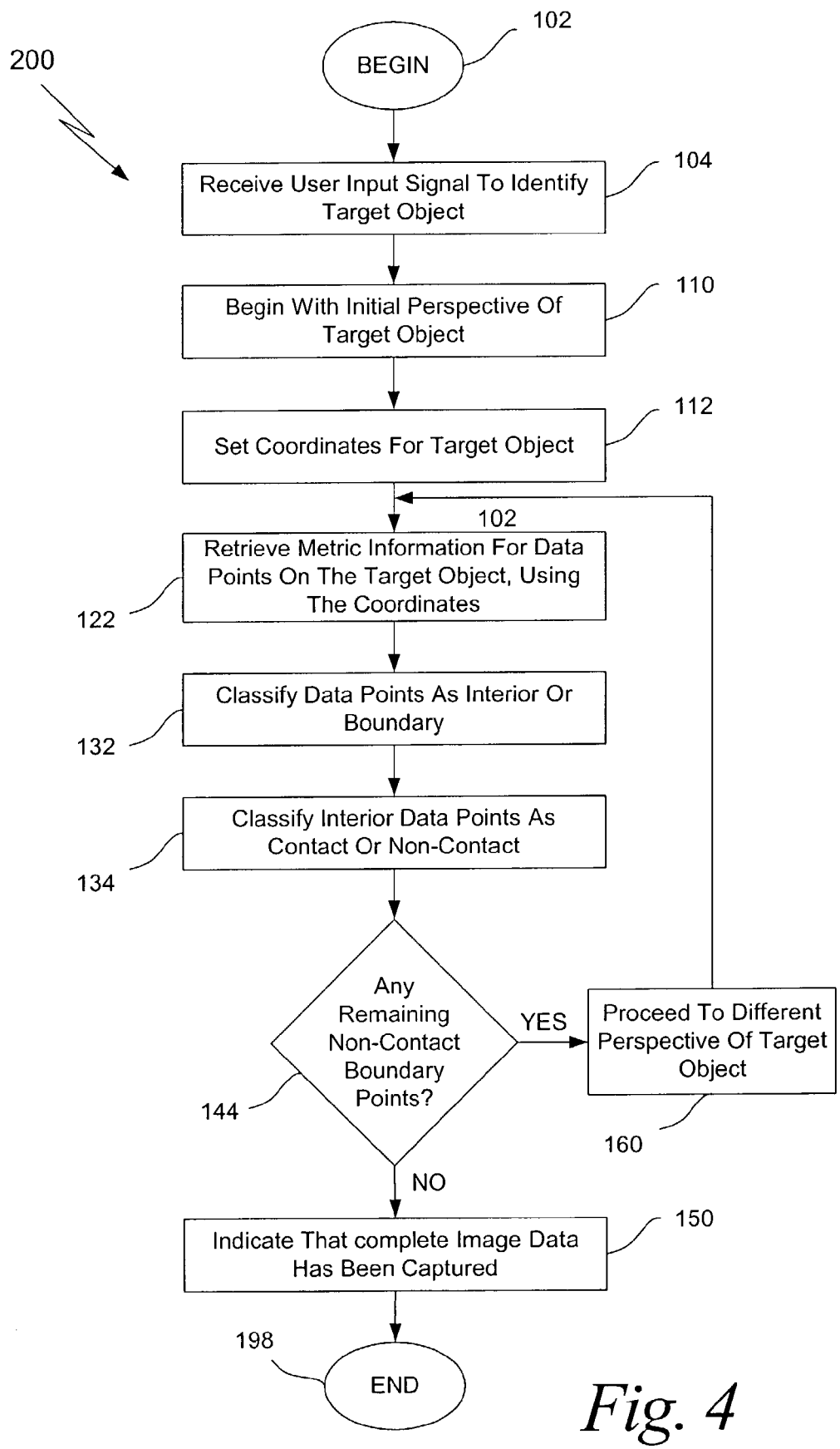
FIG. 4 shows a more detailed flow chart of one embodiment of the method shown in FIG. 3.

FIG. 4 shows a more detailed flow chart of one embodiment of the method 100 shown in FIG. 3. The method 200 shown in FIG. 4 begins 102 and receives a user input signal 104 from a user input device (32 in FIG. 1A) selecting a target object 60. The user begins with an initial perspective of the target object 110. Coordinates are set 112 for the target object 60 so that metric data retrieved for the data points (e.g., P1, P2, P3 in FIG. 1A) may be expressed in x-y-z locations. Metric information is retrieved 122 for data points (e.g., P1, P2, P3 in FIG. 1A) on the target object 60 using the coordinates. By way of example, the coordinate system may be established with an origin that corresponds to a first data point that is retrieved, or at or near the center of the target object 60. Coordinates are set for other data points relative to the origin, using the metric data.

The data points are classified as either interior or boundary points 132. Boundary points are further classified as either contact boundary points or non-contact boundary points 134. Data for the data points may be stored in memory (e.g., 12 in FIG. 2) along with the classifications. The memory 12 also stores image information for the data point, such as color and color intensity. The camera 10 then determines 144 whether there are any non-contact boundary data points (e.g., P4, P5 in FIG. 1B), which indicates that data should be captured from additional perspectives to obtain complete data. If there are no non-contact boundary points ("no" branch at block 144), then the camera 10 indicates that complete image data has been captured 150 and the method 200 ends. If there are non-contact boundary points ("yes" branch at block 144), then the user proceeds to another perspective 160 and retrieves additional metric information 122.

Figure 5:
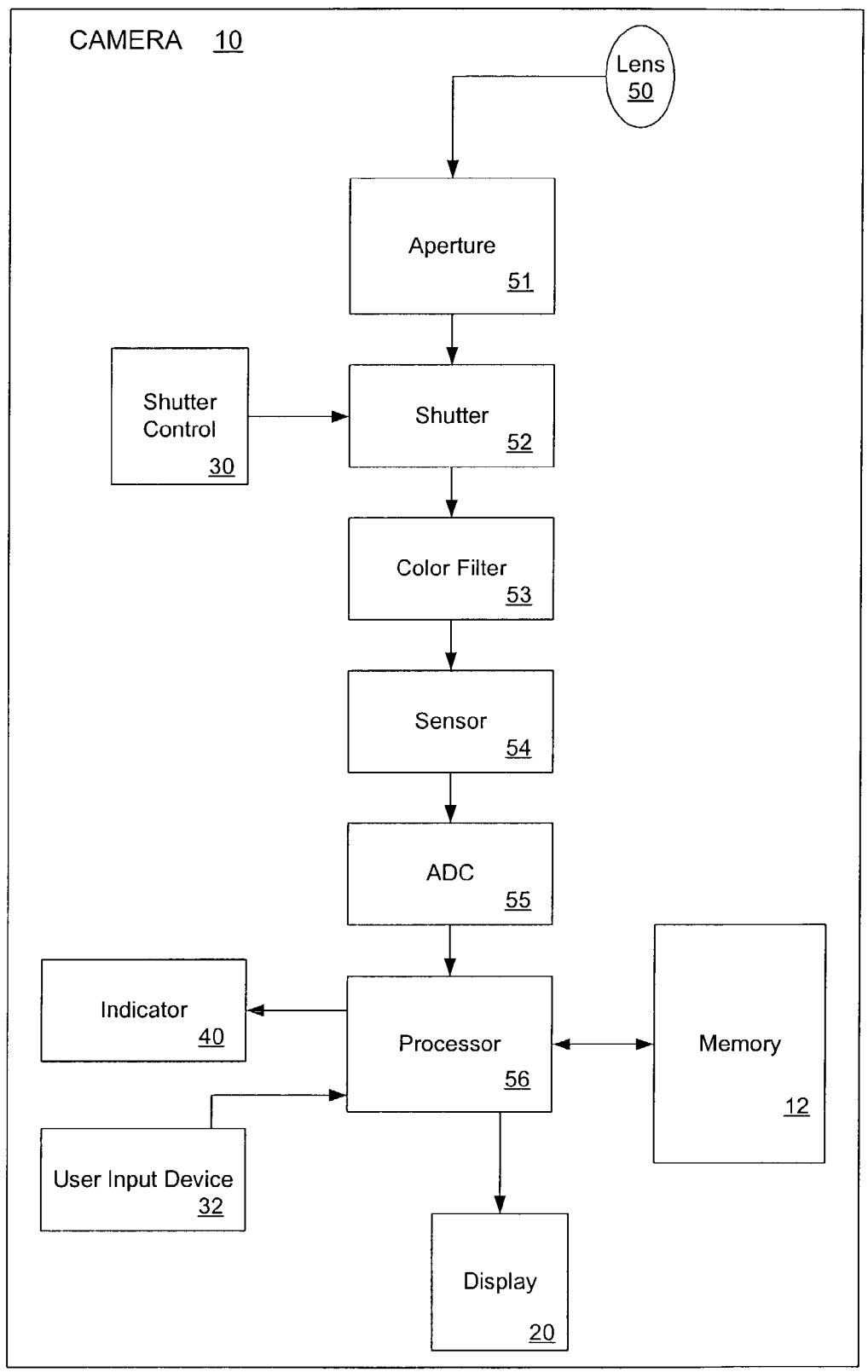
FIG. 5 shows a block diagram of the digital camera shown in FIG. 1A.

FIG. 5 shows a block diagram of the example digital camera 10 shown in FIG. 1A. The camera 10 includes a lens 50, an aperture 51, and a shutter 52. The shutter 52 may be adjusted using the shutter control 30 to capture an image of the target object 60. As used herein, a shutter 52 refers to any device used to control exposure time of a sensor to the target object 60. The shutter 52 includes, for example, a mechanical shutter or an electronic shuttering device. A color filter 53, such as a Bayer pattern filter, may be used to filter colors received by the lens 50. A sensor 54, such as a charge-coupled device (CCD) or a complementary metal oxide semiconductor (CMOS) sensor, captures an image of the target object 60 when the shutter control 30 is depressed. An analog-to-digital converter (ADC) 55 converts the image of the target object 60 to digital data to be processed by a processor 20. In some embodiments, the sensor 54 converts the sensed image to digital data, while in other embodiments, the sensor 54 and the ADC 55 may be separate.

In use, the processor 56 receives image data, including metric data for data points on the target object 60. As image data is captured for each separate image, the data is stored in the memory 12. The memory 12 stores data including coordinate information for each of the data points relative to a coordinate system. The processor 56 classifies each data point as an interior or boundary point, and further classifies each boundary point as a contact boundary point or a non-contact boundary point. The processor 56 stores the classifications to the memory 12 as each image of the target object 60 is captured. When a new image of the target object 60 is captured, the processor 56 correlates common data points detected both in the new image and in an existing image stored to memory 12. Specifically, the processor 56 determines whether non-contact boundary points in the existing data are found in the new image data as interior points. Existing non-contact boundary points that are found as interior points in the new image data are re-classified in memory 12 as interior data points. When there are no remaining non-contact boundary points stored in memory 12—that is, when all non-contact boundary points have been re-classified as interior points the processor 56 sends a signal to the indicator 40, which indicates to the user that complete data has been captured for the target object 60.

Figure 6A:
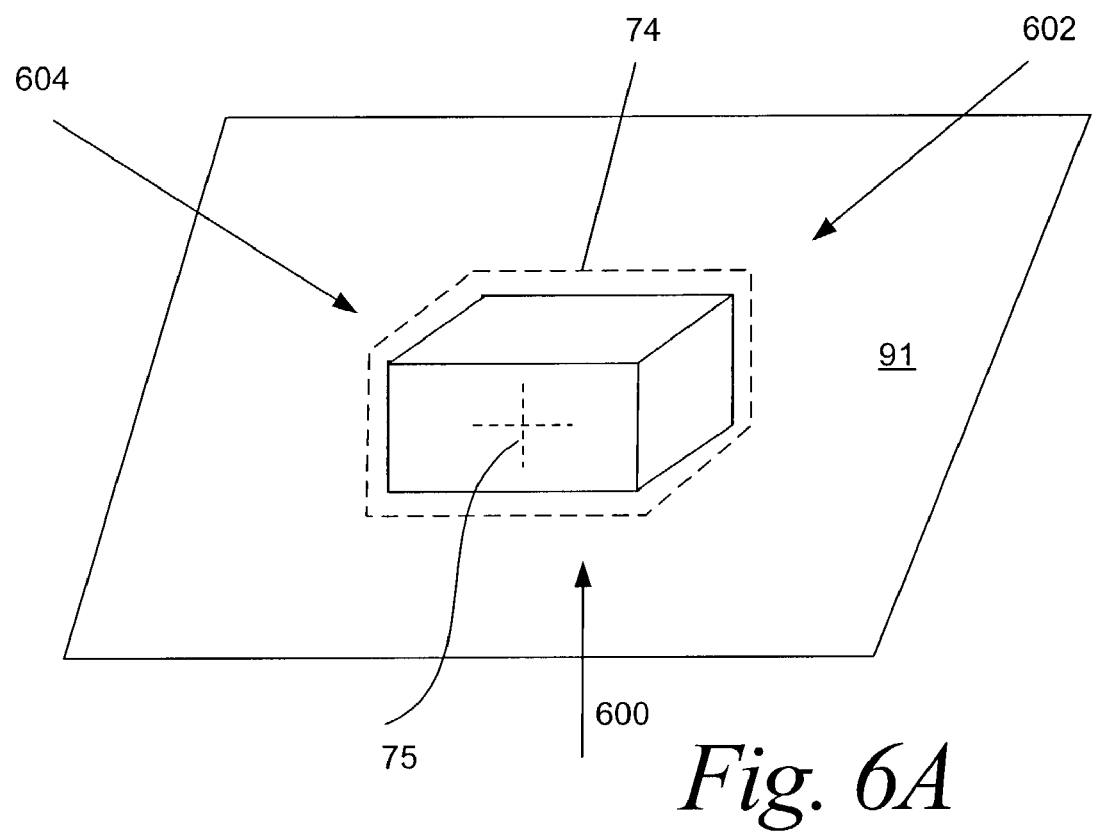
FIGS. 6A–6F show perspective views of an example target object to further illustrate application of the method of FIG. 3.

FIGS. 6A–6F show perspective views of an example six-sided rectangular box as the target object 61 to further illustrate application of the method of FIG. 3. The box 61 has visible sides A–E, and a lower side that rests on a floor 91. FIG. 6A shows a perspective view of the box 61 from a first perspective 600. Complete image data is collected by capturing images of the box 61 from other perspectives 602, 604 from which the back rear of the box is visible. In FIG. 6A, the user has selected the target object 61, as defined by the dashed line 74 encircling the perimeter of the box 61, using the display (20 in FIG. 1A) of the camera (10 in FIG. 1A). The display (20 in FIG. 1A) may include cross hairs 75 or similar reference point so assist the user in selecting the target object 61.

Figure 6B:
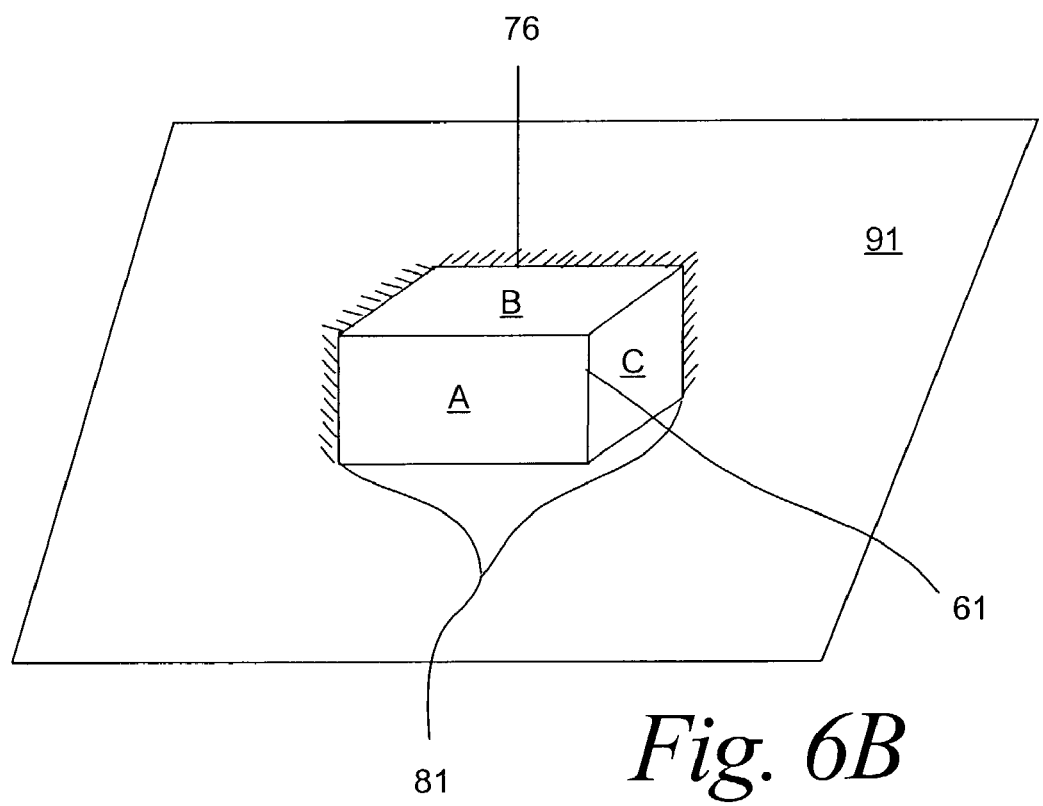

FIG. 6B shows the target object 61 having sides A, B, C that are visible from a first perspective. An image is captured by the camera (10 in FIG. 1A) from the first perspective 600 shown in FIG. 6A. From the first perspective 600, the target object 61 has a contact boundary edge 81 where the vertical sides A, C meet the floor 91, and a discontinuous edge 76 indicated by hash marks along the outer edges of the vertical sides A, C and the rear edges of the top surface B. The camera (10 in FIG. 1A) captures metric data for a plurality of points (not shown) on the target object 61 using conventional data-capturing methods known in the art.

Figure 6C:
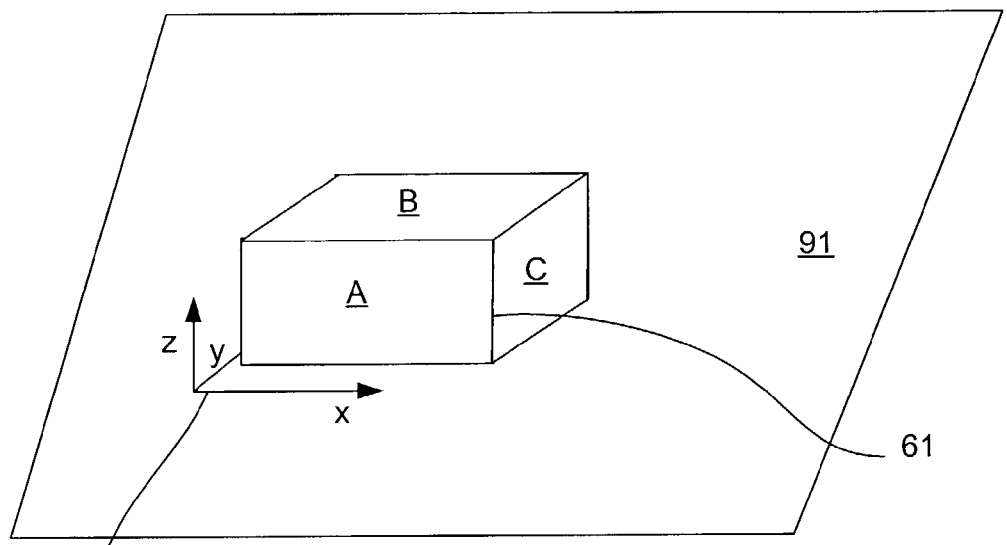
Figure 6D:
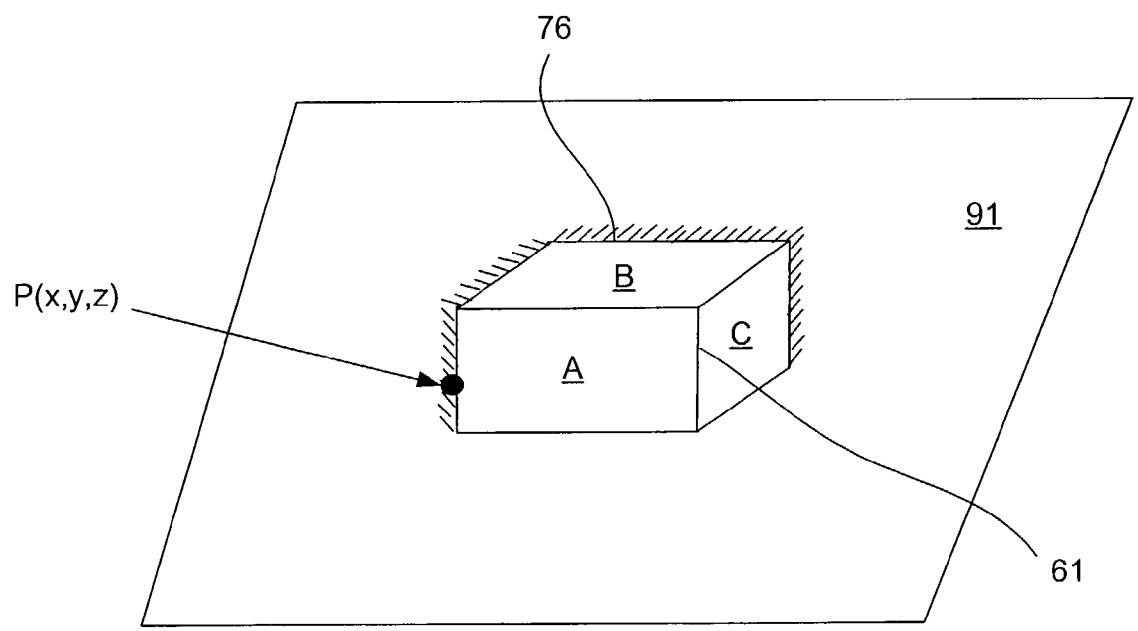

FIG. 6C shows an x-y-z coordinate system 62 applied to the target object 61 by the camera (10 in FIG. 1A). The coordinate system 62 is used to assign coordinates to the plurality of points, which coordinates are independent of the location of the camera (10 in FIG. 1A). In one embodiment, the coordinate system 62 is established after the first image is captured. As shown in FIG. 6D, each of the reference points (e.g., P) is given x-y-z coordinates (P(x, y, z)). In the example of FIG. 6D, from the first perspective 600 the point P is a boundary point on the discontinuous edge 76.

Figure 6E:
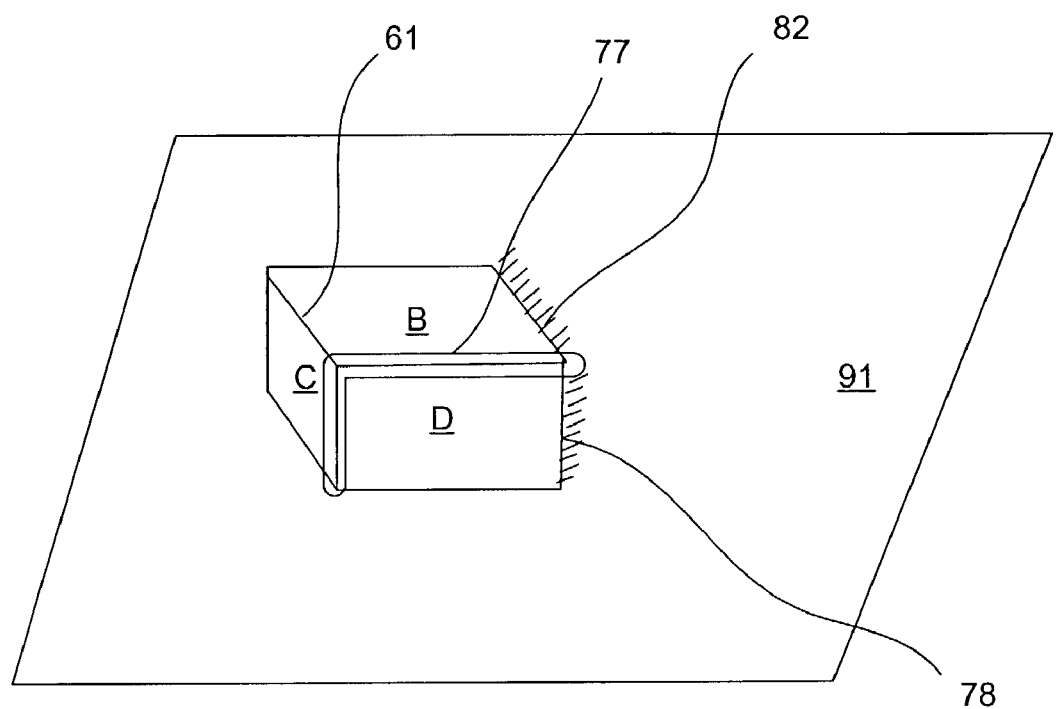

After capturing image data from the first perspective, the user captures image data for the target object 61 from a second perspective, shown as 602 in FIG. 6A. FIG. 6E shows the target object 61 as viewed from the second perspective 602. Sides B, C, and D are visible from the second perspective 602. The discontinuous edge 76 identified in FIG. 6B includes the edges 77, 82 shown in FIG. 6E. After capturing image data from the second perspective 602, a portion 77 of the discontinuous edge 76 shown in FIG. 6B may be resolved. Because the sides B, C, D are visible from the second perspective 602, the edges along the intersections of sides C-D and B-D are no longer discontinuous. The edge 82 remains discontinuous after capturing image data from the second perspective 602, as does the outside vertical edge (not shown) along side A (not shown). Also, the right side edge 78 of side D is a new discontinuous edge 78 identified from the second perspective 602.

Figure 6F:
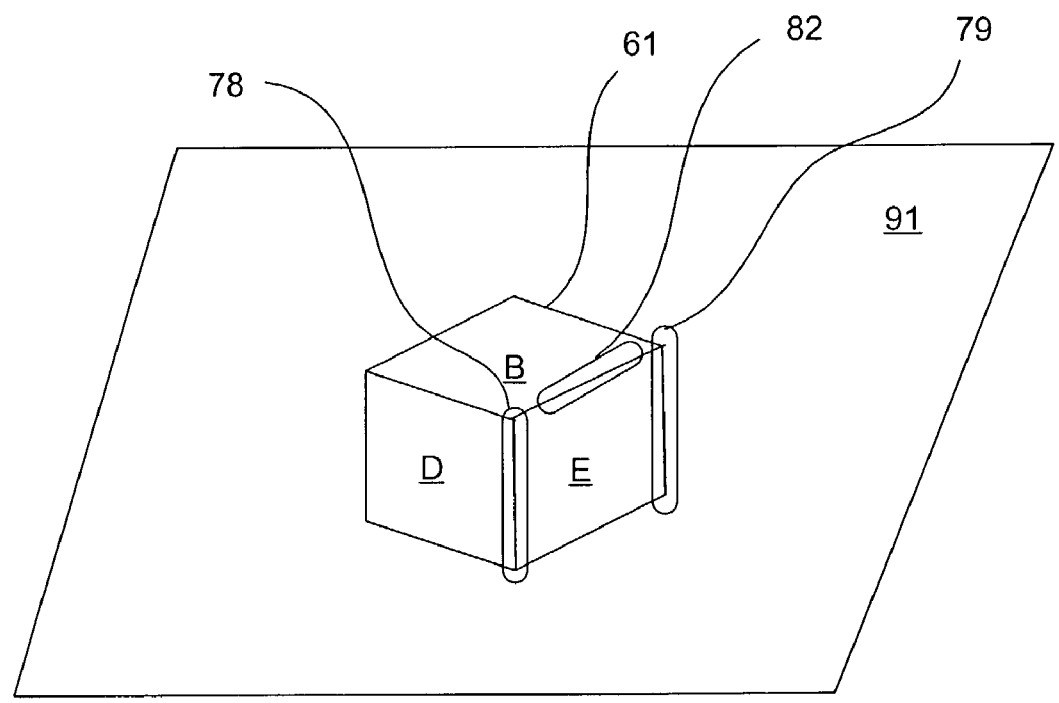

After capturing image data from the second perspective, the user captures image data for the target object 61 from a third perspective, shown as 604 in FIG. 6A. FIG. 6F shows the target object 61 as viewed from the third perspective 604. Sides B, D, and E are visible from the third perspective 604. Discontinuous edges 78, 79, 82 have been resolved with the image data retrieved from the third perspective 604. After capturing the image data from the third perspective 604 shown in FIG. 6F, complete image data has been obtained because there are no remaining discontinuous edges. The camera (10 in FIG. 1A) signals that complete data has been obtained using the indicator (40 in FIG. 1A).

Although the present invention has been described with respect to particular embodiments thereof, variations are possible. The present invention may be embodied in specific forms without departing from the essential spirit or attributes thereof. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or read-only memory (ROM). It is desired that the embodiments described herein be considered in all respects illustrative and not restrictive and that reference be made to the appended claims and their equivalents for determining the scope of the invention.

The invention claimed is:

1. A method of indicating when a complete set of image data has been captured for a target object, using a digital camera to capture image data for a plurality of images of the target object, the method comprising:
   capturing image data for an image from a first perspective of the target object;
   identifying any discontinuous edges in the image, using the image data;
   determining whether the identified discontinuous edges have been resolved in one or more other images of the target object; and
   if the discontinuous edges have not been resolved, capturing additional image data for another image from another perspective of the target object; and
   if all of the discontinuous edges have been resolved in the one or more other images of the target object, indicating that sufficient data has been captured.

2. The method of claim 1, wherein the step of capturing comprises capturing metric information for a plurality of data points on the target object.

3. The method of claim 2, wherein the step of capturing metric information comprises capturing metric information capturing x-y-z coordinates for each of the plurality of data points.

4. The method of claim 2, wherein the step of capturing metric information comprises:
   determining distances from the camera to each of the data points; and
   deriving distance information between the data points using the distances from the camera to each of the data points.

5. The method of claim 2, wherein the step of identifying comprises:
   classifying each of the data points as an interior point, a contact boundary point, or a non-contact boundary point;
   storing classification information for each of the data points to memory; and
   changing the classification information based on the additional image data.

6. The method of claim 5, wherein the step of changing comprises changing the classification information of one of the data points from a non-contact boundary designation to an interior designation if the additional image, data indicates that the one of the data points is an interior data point.

7. The method of claim 5,
   wherein the step of determining comprises determining from the classification information stored in the memory whether any of the data points are classified as non-contact boundary points;
   wherein the step of capturing additional image data comprises capturing additional image data if any of the data points are classified as non-contact boundary points; and
   wherein the step of indicating comprises indicating if none of the data points stored in the memory are classified as non-contact boundary points.

8. The method of claim 1, further comprising receiving a user input signal from a user input device positioned on the camera, which signal selects the target object.

9. The method of claim 1, further comprising combining the image data from each of the images to create three-dimensional image data.

10. The method of claim 1, further comprising, if the discontinuous edges have not been resolved, indicating locations of the discontinuous edges on the target object.

11. The method of claim 10, wherein the step of indicating discontinuous edges comprises displaying on a display the images containing the discontinuous edges and identifying the discontinuous edges on the displayed images, in response to a signal received from a user input device.

12. A digital camera that retrieves three-dimensional information for a target object by capturing image data from a plurality of images from different perspectives of the target object and indicates when complete image data is captured, the camera comprising:
    a memory that stores image data for a plurality of images of the target object, the images being from different perspectives;
    a processor that receives the image data and stores the image data to the memory, wherein in the processor identifies any discontinuous edges in each of the images and attempts to resolve the discontinuous edges using the image data from others of the plurality of images; and
    an indicator that indicates to a user that complete image data has been captured when the processor determines that there are no unresolved discontinuous edges for the target object.

13. The camera of claim 12, further comprising a user input device that selects the target object.

14. The camera of claim 12, wherein the image data comprises metric data for data points on the target object, which metric data indicates coordinates of each of the data points.

15. The camera of claim 14, wherein the processor classifies each of the data points as an interior point, a contact boundary point, or a non-contact boundary point, and stores classification information to the memory.

16. The camera of claim 15, wherein the processor initially classifies each of the data points as an interior point, a contact boundary point, or a non-contact boundary point based on image data from a first image including the data points, and thereafter re-classifies non-contact boundary points as interior points based on image data from a second image that includes the data points to resolve the discontinuous edge.

17. The camera of claim 16, wherein the processor determines whether there are any unresolved discontinuous edges by determining whether there are any data points classified as non-contact boundary points stored in the memory, and wherein the indicator indicates that complete image data has been captured when there are no non-contact boundary data points stored in memory.

18. A computer-readable medium having stored thereon instructions for performing a method of determining whether complete image data has been captured by a digital camera, for a three-dimensional target object, the method comprising:
    capturing image data for a plurality of images of the target object, the images being from different perspectives;
    storing the image data in memory as the image data is captured for each of the images;
    identifying any discontinuous edges in each of the images as the image data is captured for each of the images;
    attempting to resolve the identified discontinuous edges in each of the images by comparing the image data for each of the plurality of images with image data from others of the plurality of images, as the image data is captured for each of the images; and indicating that complete image data has been captured after all of the identified discontinuous edges have been resolved, wherein the steps of capturing, storing, identifying, and attempting respectively comprise capturing, storing, identifying, and attempting until complete image data has been captured.

19. The medium of claim 18, wherein the step of capturing comprises capturing metric data for data points on the target object, wherein the step of identifying comprises identifying non-contact boundary points for each of the images, wherein the step of attempting to resolve comprises determining from the others of the plurality of images whether the identified non-contact boundary points are interior points, and wherein the step of indicating comprises indicating after determining that each of the identified non-contact data points is an interior point.

20. The medium of claim 19, wherein the method further comprises receiving a signal from a user input device, which signal fixes a coordinate system for the target object, and wherein the step of capturing metric data comprises capturing x-y-z coordinates for each of the data points.

21. The medium of claim 18, wherein the method further comprises, after attempting to resolve the discontinuous edges, displaying one or more of the images having an unresolved discontinuous edge, on a display of the camera and identifying the unresolved discontinuous edge on the display.

* * * * *

UNITED STATES PATENT AND TRADEMARK OFFICE
CERTIFICATE OF CORRECTION

PATENT NO. : 7,050,625 B2 Page 1 of 1
APPLICATION NO. : 10/274120
DATED : May 23, 2006
INVENTOR(S) : Heather N. Bean et al.

It is certified that error appears in the above-identified patent and that said Letters Patent is hereby corrected as shown below:

In column 9, line 51, in Claim 6, delete "image," and insert -- image --, therefor.

Signed and Sealed this

Seventeenth Day of March, 2009

JOHN DOLL
*Acting Director of the United States Patent and Trademark Office*